United States Patent
Bayne (10) Patent No.: US 7,158,621 B2
(45) Date of Patent: Jan. 2, 2007

(54) PRE-PAID CALLING AND VOICE MESSAGING SERVICES FOR INMATES

(76) Inventor: Anthony J. Bayne, 25315 Andreo Ave., Lomita, CA (US) 90717-1715

( * ) Notice: Subject to any disclaimer, the term of this patent is extended or adjusted under 35 U.S.C. 154(b) by 220 days.

(21) Appl. No.: 10/282,991

(22) Filed: Oct. 29, 2002

(65) Prior Publication Data

US 2003/0198325 A1 Oct. 23, 2003

Related U.S. Application Data

(60) Provisional application No. 60/374,214, filed on Apr. 20, 2002.

(51) Int. Cl.
*H04M 15/00* (2006.01)

(52) U.S. Cl. ............... 379/114.13; 379/114.2; 379/114.21; 379/114.23; 379/144.01

(58) Field of Classification Search ........... 379/114.01, 379/114.1, 114.13, 114.2, 114.21, 114.22, 379/114.23, 144.01, 144.02, 210.02, 211.02, 379/67.1

See application file for complete search history.

(56) References Cited

U.S. PATENT DOCUMENTS

| | | | |
|---|---|---|---|
| 4,850,007 A * | 7/1989 | Marino et al. ......... 379/114.13 |
| 4,935,956 A * | 6/1990 | Hellwarth et al. ..... 379/144.02 |
| 5,210,789 A | 5/1993 | Jeffus et al. ................. 379/127 |
| 5,251,251 A | 10/1993 | Barber et al. |
| 5,355,403 A | 10/1994 | Richardson, Jr. et al. |
| 5,448,625 A * | 9/1995 | Lederman ................. 379/88.25 |
| 5,479,491 A | 12/1995 | Herrero Garcia et al. |
| 5,539,809 A | 7/1996 | Mayer et al. |
| 5,553,119 A | 9/1996 | McAllister et al. |
| 5,579,379 A | 11/1996 | D'Amico et al. |
| 5,627,887 A * | 5/1997 | Freedman ............... 379/114.21 |
| 5,652,784 A | 7/1997 | Blen et al. |
| 5,864,606 A | 1/1999 | Hanson et al. |
| 5,907,677 A | 5/1999 | Glenn et al. |
| 5,943,403 A | 8/1999 | Richardson et al. ..... 379/88.26 |
| 5,970,124 A | 10/1999 | Csaszar et al. |
| 6,009,150 A * | 12/1999 | Kamel ..................... 379/88.22 |
| 6,020,916 A | 2/2000 | Gerszberg et al. |
| 6,031,898 A | 2/2000 | Jordan et al. ................ 379/114 |
| 6,052,454 A | 4/2000 | Kek et al. |
| 6,064,963 A | 5/2000 | Gainsboro .................. 704/270 |

(Continued)

OTHER PUBLICATIONS

Free Long Distance Calls http://www.wired.com/news/business/0,1367,13140,00.html.

(Continued)

*Primary Examiner*—Quoc Tran
(74) *Attorney, Agent, or Firm*—Sutherland Asbill & Brennen LLP (57) ABSTRACT

Inmates place free incoming calls to a call processing system and are prompted to choose between accessing a voice mail system and calling an outside party. If an outside party is to be called, an inmate provides a phone number and an outgoing call is placed to the outside party. If the outside party provides payment for the call, the inmate is connected to the outgoing call and the incoming call is terminated. If the outgoing call is not accepted, the inmate may record a voice message for the outside party in a voice mailbox assigned to the inmate. For an access fee, the outside party may access the voice mailbox assigned to the inmate. Advertising messages may be presented to inmates during incoming calls and/or to outside parties during outgoing calls. Advertising revenue may cover incoming call charges. Inmates and/or outside parties may record voice messages for advertisers.

45 Claims, 5 Drawing Sheets

U.S. PATENT DOCUMENTS

| | | | |
|---|---|---|---|
| 6,167,119 | A | 12/2000 | Bartholomew et al. |
| 6,263,056 | B1 * | 7/2001 | Gruchala et al. ...... 379/114.01 |
| 6,285,749 | B1 * | 9/2001 | Manto ................... 379/114.23 |
| 6,404,858 | B1 | 6/2002 | Farris et al. |
| 6,421,433 | B1 | 7/2002 | Arsenault |
| 6,611,583 | B1 * | 8/2003 | Gainsboro ................... 379/188 |
| 6,639,977 | B1 * | 10/2003 | Swope et al. .......... 379/114.21 |
| 6,668,045 | B1 * | 12/2003 | Mow ........................ 379/88.19 |
| 2001/0026609 | A1 | 10/2001 | Weinstein et al. |
| 2002/0055873 | A1 | 5/2002 | Speicher |
| 2002/0071537 | A1 | 6/2002 | Gainsboro |
| 2002/0077130 | A1 | 6/2002 | Owensby |
| 2002/0086662 | A1 | 7/2002 | Culliss |

OTHER PUBLICATIONS

Voicemail Connect http://www.voicemailconnect.ws/information/html.

JConnect Premier http://jsource.j2.com/sp/premier/premier_30dayfree_act.asp?BID=418-3438-3250.

* cited by examiner

PRE-PAID CALLING AND VOICE MESSAGING SERVICES FOR INMATES

RELATED APPLICATIONS

The present application claims the benefit of U.S. Provisional Patent Application Ser. No. 60/374,214, filed Apr. 20, 2002, which is hereby incorporated by reference as if set forth fully herein.

TECHNICAL FIELD

The present invention relates generally to pre-paid calling and voice messaging services in a telecommunication system. More particularly, the present invention relates to systems and methods for providing pre-paid communications between inmates in custodial facilities and their friends and families through specialized call-forwarding and voice messaging services.

BACKGROUND OF THE INVENTION

Criminal defense attorneys and bail bondsmen spend significant amounts of money annually in advertising. These service providers seek to be retained by incarcerated individuals and/or their families. Many advertising mediums are used by these service providers in an attempt to obtain criminal clients, including phone directories, radio and television commercials, billboards, bus-stop bench ads, and "jail mail" which is sent to the home of the incarcerated person. However, none of these advertising mediums are guaranteed to reach the individual detainee, or to have his or her undivided attention.

People who cannot make bail and remain incarcerated do not usually have access to billboard or bus stop bench advertisement. Similarly, incarcerated persons may not have the opportunity to see a television advertisement, or hear a radio advertisement while in custody. Assuming incarcerated persons have access to a phone directory containing advertisements, their attention may be divided between multiple advertisers, thereby diluting the value of each advertiser's investment. Therefore, there remains a need for an alternative advertising medium that can be more effectively targeted to incarcerated people and their families.

It is well known that penal facilities are largely filled with poor people. The families of these poor incarcerated persons are often poor also, and may have their phones prohibited (blocked) from receiving collect calls and/or disabled from making toll calls (e.g., "900" type calls). Incarcerated persons are almost exclusively limited to making collect calls. Thus, it can be expensive, if not impossible for an incarcerated person to call a family member. Further, incarcerated persons have limited opportunities to make phone calls due to restricted access to telephones. In addition, friends and family members cannot directly call an incarcerated person, as the incarcerated person does not have a phone in his or her individual cell. Therefore, there remains a need for an improved channel of communication between incarcerated persons and their families, so as to ease the financial and scheduling burdens normally placed on the families of incarcerated persons.

SUMMARY OF THE INVENTION

The present invention meets the above-described needs by providing pre-paid calling and voice messaging services for inmates and their families and friends ("outside parties"). In certain aspects, the invention provides systems and methods for processing a call placed by an inmate from a custodial facility using a custodial facility phone. The incoming call (e.g., a call made by the inmate to the system) is free of charge to the inmate and may be a collect call, toll-free call, or any other suitable call type (e.g., a tie-line call). An origination number of the custodial facility phone from which the incoming call is placed may be identified and a determination may be made as to whether the origination number is associated with an authorized custodial facility. If the origination number is not associated with an authorized custodial facility, the incoming call may be terminated.

When the incoming call is received from an authorized custodial facility, the inmate may be prompted to choose between accessing a voice mail system and calling an outside party. If the inmate chooses to access the voice mail system, the inmate may be provided access to a voice mailbox assigned to the inmate. The inmate may be prompted to input an access code before access to the voice mailbox is granted. The inmate may be denied access to the voice mailbox if the access code cannot be authenticated, if the voice mailbox has been inactive for too long or if the inmate's voice mail privileges have been suspended for violation of any condition placed upon use of the voice mailbox. The access code may comprise an inmate identification code assigned to the inmate by the custodial facility.

If the inmate chooses to call the outside party, the inmate is prompted to input a phone number for the outside party. Then an outgoing call is placed to the outside party using the phone number input by the inmate. If the outside party answers the outgoing call, a determination is made as to whether the outside party provides a payment to cover charges for being connected to the inmate. The payment may be provided by the outside party by way of a prepaid calling card, a credit card or a debit card. If the outside party provides the payment, the inmate is connected to the outgoing call and the incoming call is terminated.

If the outside party does not answer the outgoing call, the inmate may be provided an opportunity to record a voice message for the outside party in the voice mailbox assigned to the inmate. The outside party may subsequently be provided with access to the voice mailbox assigned to the inmate in exchange for an access fee. The access fee may be paid by the outside party by way of a toll charge billed to a phone bill of the outside party, a prepaid calling card, a credit card or a debit card. If the outside party answers the outgoing call but does not provide payment, the outside party may be informed regarding the sale of prepaid calling cards and the outgoing call may be terminated without connecting the inmate to the outgoing call. After the outgoing call is terminated, the inmate may be provided with an opportunity to record a voice message for the outside party in the voice mail box assigned to the inmate.

An advertising message may be presented to the inmate during the incoming call and/or to the outside party during the outgoing call. The advertising message may be paid for through advertising revenue collected from an advertiser. The advertising revenue may be used to cover charges for the incoming call from the inmate. The advertising message may relate to services selected such as bail bond services and attorney services. The inmate and/or the outside party may each be provided with an opportunity to leave a voice message for the advertiser in a voice mailbox assigned to the advertiser.

The advertiser may specify one or more geographic regions in which the advertising message is to be targeted. The advertising message may be presented to the inmate during the incoming call only if the inmate has ties to the one or more geographic regions. Similarly, the advertising message may be presented to the outside party during the outgoing call only if the phone number of the outside party is associated with the one or more geographic regions.

These and other features, aspect and embodiments of the invention will be described in more detail below.

BRIEF DESCRIPTION OF THE DRAWINGS

FIG. 2, comprising

DETAILED DESCRIPTION OF THE INVENTION

The present invention provides specialized pre-paid calling and voice messaging systems and methods for allowing inmates to communicate with parties outside of custodial facilities. Calls to and from an inmate are pre-paid by way of advertising revenue and/or by way of pre-paid calling cards, smart cards, credit cards, etc. supplied by the outside parties. A call processing system may be configured to receive a call from an inmate and to connect the call to an outside party able to provide up-front payment for the call. If the outside party is not able to provide up-front payment for the call, the call processing system may allow the inmate to record a voice message that can subsequently be accessed by the outside party. An access fee may be charged to the outside party for access to the voice messaging system. The call processing center may also be configured to present targeted advertising messages to inmates and/or to outside parties at selected times.

Although the following description of exemplary embodiments with be described in the context of prison inmates, it should be understood may also be applicable in other embodiment to other custodial facilities where access to a telephone by the person in custody is restricted. Thus, the term "inmate" as used herein should be broadly construed to encompass any person held in a jail, prison, detention center, youth authority, mental hospital, incarceration facility, or any other custodial facility.

The present invention may be used to establish a new revenue stream for participating phone companies and/or custodial facilities. As an example, advertising revenue may be collected by a custodial facility and increased call volume may lead to greater income for the phone company. Advertising dollars are more efficiently spent by advertisers through use of the present invention. For example, advertising messages from bail bondsmen, criminal defense attorneys and other interested parties can be targeted to inmates who require their services. Such advertising messages are virtually guaranteed to reach the intended audience. Additional advertising revenues may be generated through the sale of private label pre-paid calling cards.

The present invention also provides benefits to friends and family members of inmates. Through use of the invention, these parties do not need to own a phone to stay in communication with an inmate. Voice messages left by the inmate for outside parties can be accessed by the outside parties from any phone anywhere in the world. Friends and Family members can pay as they go, using a 900 number, a credit card, debit cards pre-paid calling card or other form of up-front payment. The messaging services of the present invention alleviate the need for family members to plan their schedules so as to be by a phone when the inmate might be allowed to call or to have an answering machine able to automatically accept collect calls.

Figure 1:
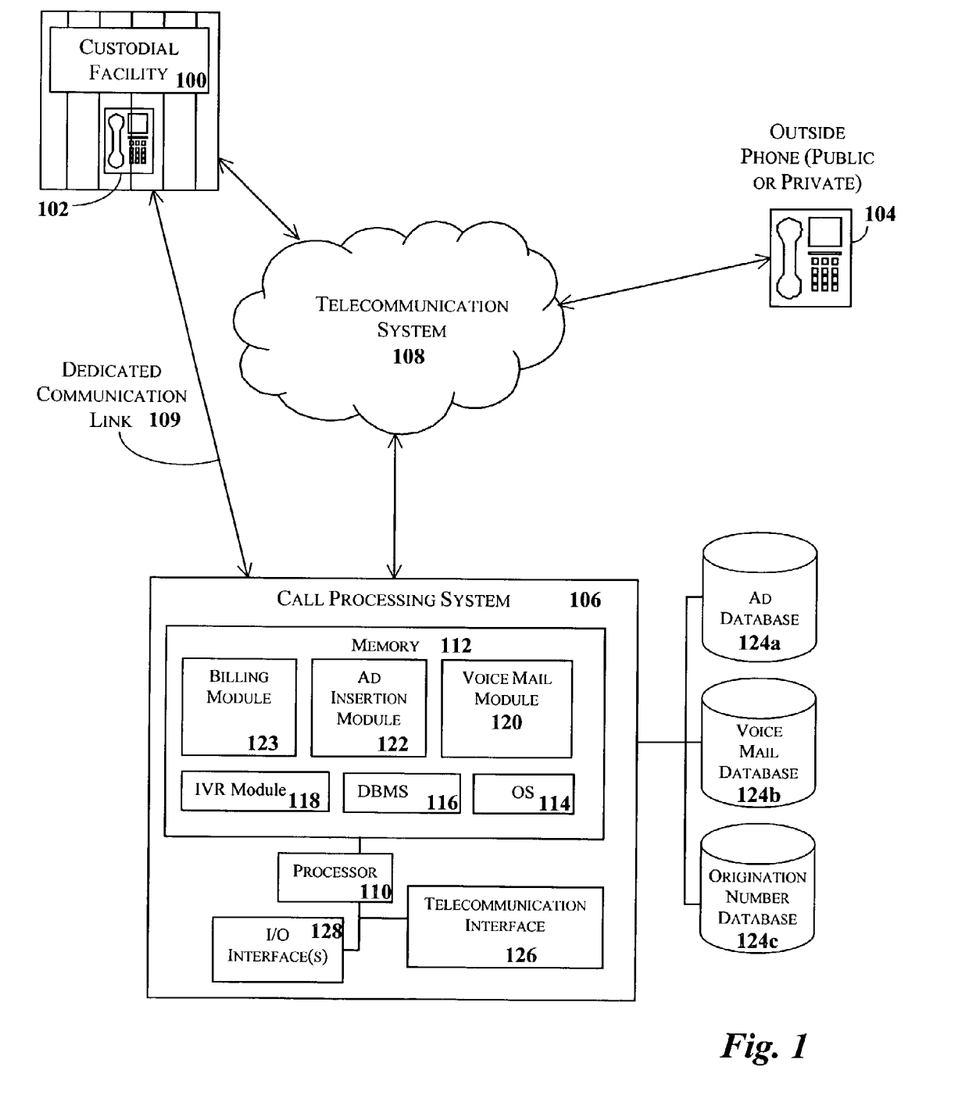
FIG. 1 is a block diagram illustrating an exemplary system in accordance with certain embodiments of the present invention.

Exemplary embodiments of the present invention will hereinafter be described with reference to the figures, in which like numerals indicate like elements throughout the several drawings. FIG. 1 is a block diagram illustrating an exemplary operating environment for implementation of certain embodiments of the present invention. The exemplary operating environment includes a custodial facility 100 having at least one custodial facility phone 102, at least one public or private telephone outside the custodial facility ("outside phone") 104 and a call processing system 106. A telecommunication system 108 connects the custodial facility phone 102, the outside phone 104 and the call processing system 106. In certain embodiments, a dedicated communication link 109, such as a tie-line, may connect the custodial facility phone to the call processing system 106.

The telecommunication system 108 may be any public and/or private communication network. In certain embodiments, the telecommunication system 108 is the Public Switched Telephone Network (PSTN). The telecommunication system 108 may include wired and/or wireless segments and may carry digital and/or analog signals. In alternate embodiments, the telecommunication system 108 may take other forms, such as a voice over IP network or other type of data network. The various components and functionality of typical telecommunication systems 108 are well known in the art and are therefore not reiterated herein.

The custodial facility phone(s) 102 and the outside phone(s) 104 may be any traditional telephones or other communication devices that are configured to interact with a telecommunication system 108. For example the custodial facility phone(s) 102 and the outside phone(s) 104, may be Touch-Tone telephones, rotary telephones, cellular or mobile phones, and the like. In other embodiments, custodial facility phone(s) 102 and the outside phone(s) 104 could be replaced or supplemented by other communication devices, such as personal computers, laptop computers, hand-held computers, personal digital assistants ("PDA"), pagers, etc., as may be appropriate.

The call processing system 106 is contemplated as being a processor-driven device or collection of devices that is configured for receiving and processing telephone calls. The call processing system 106 may further be configured for accessing and reading associated computer-readable media having stored thereon data and/or computer-executable instructions for implementing the various methods of the present invention. In particular, the call processing system 106 may be driven by a processor 110 for processing data and executing computer-executable instructions. The call processing system 106 also includes a memory 112, which may take the form of any computer-readable medium. The memory 112 may be logically and/or physically divided into multiple units.

The memory 112 stores data and program modules, such as, for example, an operating system ("OS") 114, a database management system ("DBMS") 116, an Interactive Voice Response ("IVR") module 118, a voice mail module 120, an ad insertion module 122 and a billing module 123. These and/or other program may be executed by the call processing system 106 to perform the various methods of the present invention. By way of example, the IVR module 118 may provide functionality for responding to voice or other responses, such as Touch Tones, provided by a caller to the call processing system 106. The voice mail module 120 may provide functionality for recording, storing and retrieving voice messages. The ad insertion module 122 may provide functionality for retrieving advertising messages from a database and for playing such advertising messages to a caller. The billing module 123 may provide functionality for generating bills for advertisers, who may be charged each time their advertisement is played or on a flat fee basis.

IVR functionality, voice mail functionality, ad insertion functionality and billing functionality are well known in the art and are therefore not explain in detail herein. Those skilled in the art will appreciate that such functionality may be combined into fewer program modules or distributed among a greater number of modules than are illustrated in FIG. 1. In addition, such functionality may be distributed across multiple processor-driven devices, such as dedicated network servers, that collectively form the call processing system 106.

The call processing system 106 may include or be in communication with one or more databases. By way of illustration only, the call processing system 106 may be in communication with an ad database 124a for storing advertising messages, a voice mail database 124b for storing voice messages and an origination number database 124c for storing a list of origination phone numbers authorized to access the call processing system 106. In certain embodiments, the ad database 124a may be combined with the voice mail database 124b. In such embodiments, advertising messages may take the form of outgoing greetings associated with an advertiser's voice mailbox.

These and/or other databases may of course also store any other data used or generated by the call processing system 106. Those skilled in the art will appreciate that the illustrated databases 124a–c may be physically and/or logically separate from one another. For security, the call processing system 106 may have a dedicated connection to the databases 124a–c, as shown. However, the call processing system 106 may also communicate with one or more of the databases 124a–c via the telecommunication system 108 or other network.

Telephone calls may be received at the call processing system 106 through a telecommunication interface 126. The telecommunication interface 126 may take the form of a telephony line card or other suitable hardware and/or software for connecting the call processing system 106 to the telecommunication system 108 and providing the logical connection between the call processing system 106, custodial facility phones 102 and outside phones 104. The telecommunication interface 126 thus allows the caller (e.g., inmate or outside party) to interact with the call processing system 106 by providing voice commands or Touch-Tone commands that can be interpreted by the IVR module 118 and/or other program modules. The call processing system 106 may be configured with additional and/or other communication interfaces for providing logical connections to other types of communication devices and networks.

The call processing system 106 may also include input/output ("I/O") interface(s) 128 for providing logical connections to various I/O devices, such as a keyboard, a mouse, a microphone, a printer, a scanner, speakers, a display, etc. A system administrator may utilize these and other I/O devices to interact with the call processing system 106. For example, a system administrator may interact with the call processing center 106 to populate and edit the origination number database 124c, store and delete advertising messages from the ad database 124a, alter the parameters for the IVR module 118, the voice mail module 120 and other program modules, etc. In certain embodiments, advertisers themselves may record and store advertising messages in the ad database 124 or in the voice mail database 124b. Those skilled in the art will appreciate that the call processing system 106 may include alternate and/or additional components, hardware or software.

Thus configured or similarly configured, the call processing system 106 may provide pre-paid call forwarding, (e.g., prepaid by inmate or outside party payee utilizing a prepaid calling card, credit card, debit card, smart card, or any other suitable prepayment format) and voice message services for inmates. The call processing system 106 may be programmed to receive calls from an inmate using a custodial facility phone 102. The call processing system 106, by way of the IVR module 118 for example, may identify the origination phone number of the custodial facility phone 102 and compare the origination phone number to a directory of participating or authorized custodial facilities stored in the origination number database 124c. If the origination phone number corresponds to a participating or authorized custodial facility, the inmate's call may be processed and any "collect call" charges may be accepted. Otherwise the inmate is notified that the "phone number dialed is not in service" or a similar notification is provided to the inmate and the call is terminated.

If the Inmate's call is accepted for processing, the call processing system 106 may prompt the inmate to indicate whether instructions for using the service should be provided in English, Spanish or another available language option. For example, the IVR module 118 may prompt the inmate to press a key corresponding to a language selection or to say the name of the desired language. The IVR module 118 may also be programmed to advised the inmate that all calls are free to the inmate, but that outside called parties will incur charges to accept calls from the inmate or to access voice messages recorded by the inmate. Other terms and conditions for use of the services provided by the call processing system 106 may be audibly presented to the inmate, for example by the IVR module 118.

The call processing system 106, again by way of the IVR module 118 as an example, may prompt the inmate to indicate whether he or she will hear advertising messages that may be relevant to the inmate. Advertising messages may be, for example, related to bail bondsmen, attorneys and other parties who may desire to provide products or services to the inmate or family or friends of the inmate. In certain cases, the inmate may be forced to listen to one or more such advertising messages as a condition for using the services provided by the call processing system 106.

The call processing system 106, for example through the billing module 123, may track the number of times that advertising messages are played. Advertisers may be billed based on the number of times that their advertising messages are played or on a flat fee basis (e.g., a monthly subscription fee). Advertising revenue may be used to cover the cost incurred for providing inmates with access to the call processing system 106, either through collect calls or through a toll-free number. If toll-free access to the call processing system 106 is provided to inmates, different toll-free numbers may be assigned to different geographical regions. In such embodiments, each toll-free number could be used by custodial facilities 100 located within the corresponding geographical region. Using this technique, advertisers can choose to have their advertising messages heard by inmates calling only selected toll-free numbers.

As another example, advertisers may be given the option to narrow the audience that will hear have their advertisement. Advertisers may be given three choices of advertising specificity: "specific," "adjacent," and "regional." A specific level of advertising specificity may allow an advertiser to specify the particular geographic region(s) (e.g., identified by zip codes or area codes) to which advertisements should be targeted. An adjacent level of advertising specificity may allow an advertiser to specify one or more geographic region to which advertisements should be targeted and will automatically include adjacent geographic regions. A regional level of advertising specificity may allow an advertiser to target advertisements to an entire geographic region (e.g., an entire city, county, state, or multiple state area).

According to the above example, the inmate may be prompted to indicate one or more geographic regions to which he or she has ties. By way of illustration, the inmate may be asked to provide his or her home zip code or area code. In addition, information about a called outside party may be determined from any phone numbers that the inmate provides in order to place outgoing calls to such parties. Geographic information may be stored in a database or otherwise in association with the inmate and may be used to target advertising messages to the inmate and/or to the outside parties. In this manner inmates will hear from advertisers who are located close to his or her home and are thus most easily accessed and hired by the inmate's family.

When an inmate accesses the call processing system 106 from an authorized or participating custodial facility 100, the inmate may be prompted to choose whether he or she desires to call an outside party or to access the voice mail system. By way of example, if the inmate desires to call an outside party, the IVR module 118 may instruct the inmate to identify himself or herself and to input the phone number of the outside party to be called. The IVR module 118 may, in certain embodiments, place the incoming call from the custodial facility phone 102 on hold and may dial an outgoing call to the outside party phone 104. If the outside party answers the outgoing call and provides a valid pre-paid calling card number, credit card number or other form of payment, the call processing system 106 may connect the inmate to the outgoing call and terminate the inmate's incoming call. In this manner, charges are no longer incurred as a result of the inmate's call to the call processing center 106 and the outside party bears all additional costs for communicating with the inmate. Other methods for connecting the inmate to the outside party are known in the art and are contemplated herein. In the preferred embodiments, all payment processing and verification services involving the called outside party are handled by the telecommunication system 108, for example by a participating telephone company.

If the outside party answers the call but is not able to provide payment, the call processing system 106 (e.g., via the IVR module 118) may inform the outside party where pre-paid calling cards can be purchased and that they can later access an inmate's voicemail to retrieve messages from the inmate. An access code and pre-paid calling card number, credit card number or other form of payment may be required to gain access to the inmate's voice mailbox. As one example, an access code may consist of the inmate's date of birth and an inmate identification code (e.g., booking number) that is assigned to the inmate by the custodial facility. The call processing system 106 may provide the access code and the phone number for the voice mail system to the outside party or the responsibility to disseminate that information may be left to the inmate. In certain embodiments, the custodial facility may separately mail or otherwise communicate the access code and phone number assigned to the call processing center 106 to one or more outside parties designated by the inmate.

If the inmate desires to access the voice mail system, the IVR module 118 may interact with or pass the call off to the voice mail module 120. The voice mail module may be configured recording, storing and playing voice messages. In certain embodiments, an inmate may be allowed only a single voice mail box and anyone accessing that voice mailbox will be able to hear all messages stored therein. In other embodiments, a single voice mailbox may be assigned to an inmate but different access privileges may be assigned to the inmate and to outside parties. For example, the inmate may be provided with full access to all stored voice messages, while outside parties may be provided with access only to voice messages recorded by the inmate. In still other embodiments, multiple access codes, each having different access privileges, can be assigned to an inmate's voice mailbox or multiple voice mail boxes can be assigned to an inmate.

In general, however, it may preferable to limit the inmate's control over a voice mailbox, so that the system administrator can more easily manage the voice mail system. The system administrator may be provided with authority to delete voicemail boxes or suspend the access privileges of an inmate or an outside party. The system administrator may also have authority to access an inmate's voice mailbox and to delete or reproduce any voice message. To control the size of the voice mail database 124b, an inmate's voice mailbox may be manually or automatically terminated or suspended upon the occurrence of certain events. As an illustration, a voice mailbox may be deleted if it remains unused for a predetermined number (e.g., 30) of days or if there is any violation of the terms and conditions of use. If an outside party uses a toll number (e.g., a 900 number) to access an inmate's voice mailbox and subsequently disputes any charges, that outside party may be denied further access to the system.

Those skilled in the art will appreciate that the operating environment shown in and described with respect to FIG. 1 is provided by way of example only. Numerous other operating environments, system architectures and device configurations are possible. For example, the call processing center may in certain embodiments be implemented at or within the custodial facility 100. In other embodiments, various components of the PSTN may be adapted for performing the functionally described with respect to the present invention. Accordingly, the present invention should not be construed as being limited to any particular operating environment, system architecture or device configuration.

Figure 2A:
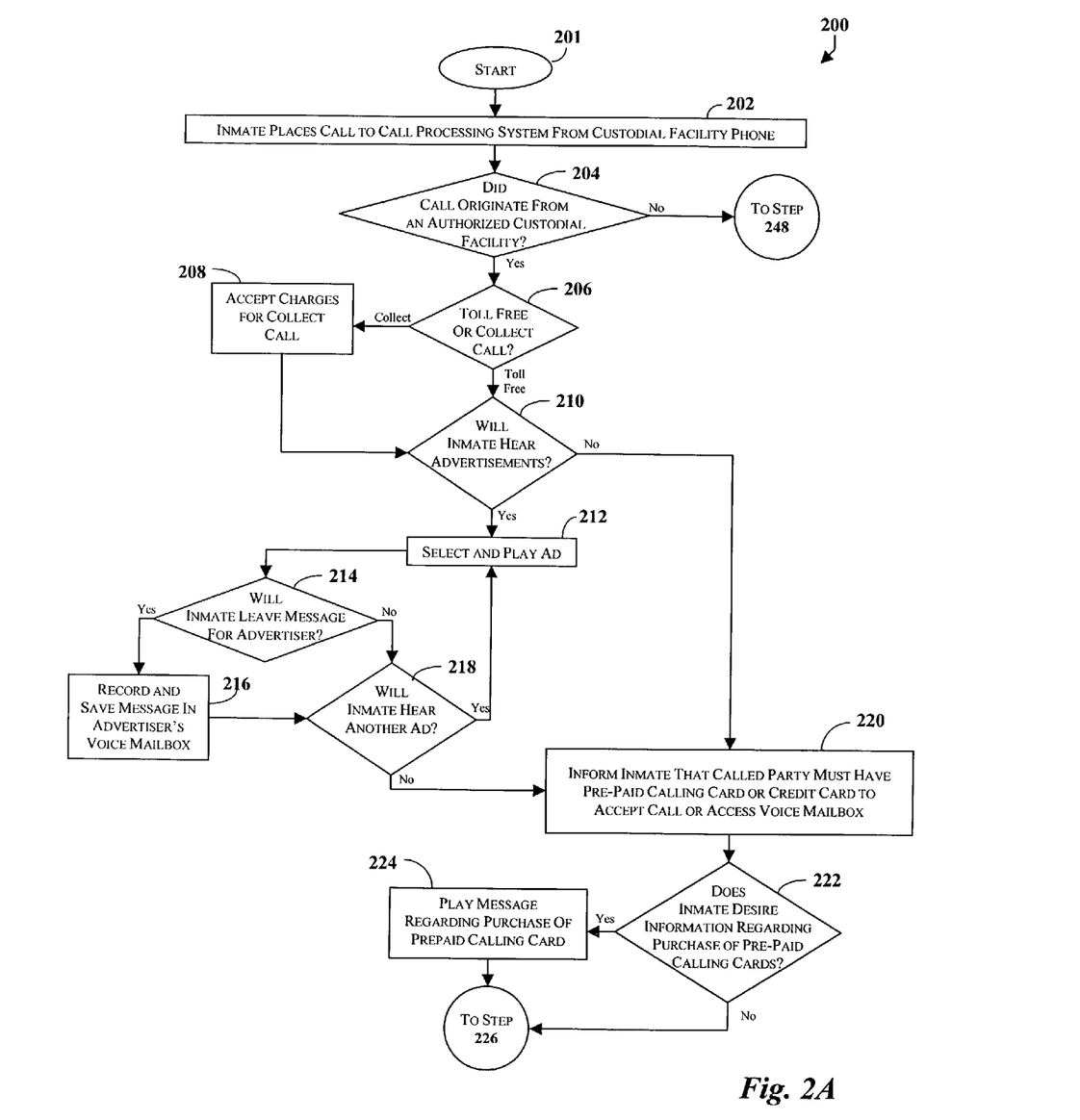
FIG. 2A and FIG. 2B, is a flow diagram illustrating an exemplary method for processing a call placed by an inmate from a custodial facility in accordance with certain embodiments of the present invention.
Figure 2B:
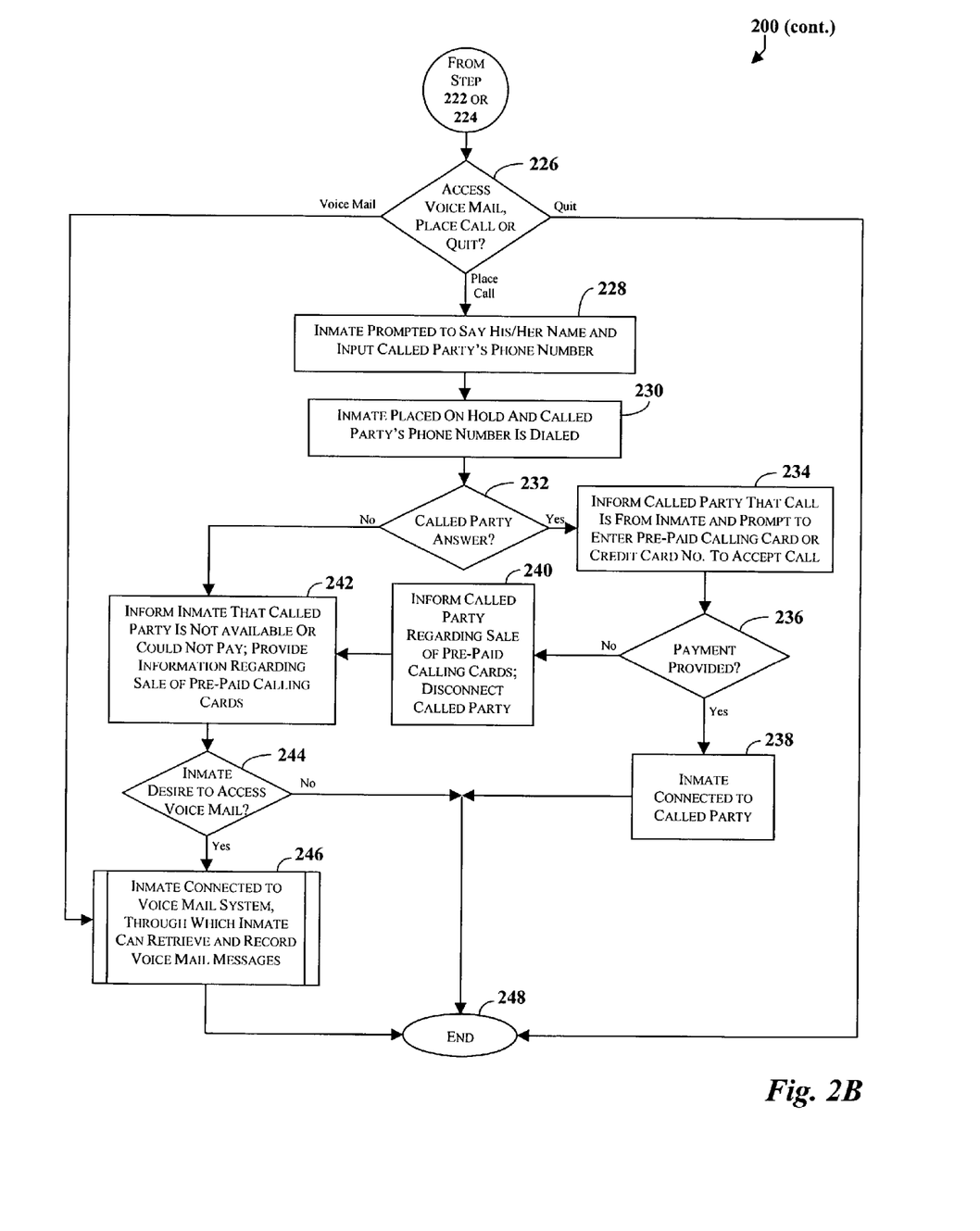

FIG. 2, comprising FIG. 2A and FIG. 2B, is a flow diagram illustrating an exemplary method for processing an incoming call placed by an inmate to the call processing system 106, in accordance with certain embodiments of the invention. With reference to FIG. 2A, the method begins at starting block 201 and progresses to step 202, where the inmate initiates a call to the call processing system 106 using the custodial facility phone 102. The incoming call may be placed by the inmate by a tie-line or by dialing a special toll-free phone number (e.g., a 1–800 number) or by placing a collect call using a phone number assigned to the call processing system 106. As mentioned, some custodial facilities 100 permit only collect calls to be to be placed from their custodial facility phones 102. Signage or other informational material may be provided, for example, in the vicinity of the custodial facility phone 102 in order to inform the incarcerated person of the phone number assigned to the call processing system 106.

Next at step 204, the call processing system 106 receives the incoming call and determines whether the call originated from an authorized custodial facility 100. A list of authorized custodial facilities 100 and their corresponding origination phone numbers may be stored, for example, in an origination number database 124c. An authorized custodial facility 100 is one that has agreed to participate in the services offered by the call processing system 106. Thus, as an incoming call is received by the call processing center 106, the origination phone number may be identified and the database 124c may be interrogated based on the origination phone number. If the incoming call cannot be verified as originating from an authorized custodial facility 100, the exemplary method ends at step 248.

In certain embodiments, any call placed from a custodial facility 100 may be accepted by the call processing system 106. In such embodiments, the call processing system 106 must be configured to determine whether the call originated from a custodial facility 100. Again, an origination number database 124c may be interrogated to determine if the origination phone number is recognized as being assigned to a custodial facility 100. If the origination number cannot be identified, the call processing system 106 may attempt to verify the call by attempting to detect an automated message indicating that the call is from a custodial facility 100. Automated messages such as "This call is from a penal institution. To accept this call please press '1' or say 'yes'" are commonly used to identify calls placed from certain types of custodial facilities 100. If the incoming call cannot be identified through automated processes, the call may be transferred to a live operator, who may listen for an automated identification message and/or pursue other means to attempt to verify that the call is from a custodial facility 100. If the call cannot be verified as originating from a custodial facility 100, the call may be dropped and the exemplary method ends at step 248.

If the incoming call is verified to have originated from an authorized custodial facility, the method proceeds to step 206, where a determination is made as to whether the incoming call is a collect call or a toll-free call. If the incoming call is a collect call, the call processing center 106 may accept the charges associated with the call at step 208. After the collect call charges are accepted at step 208, or if the incoming call is determined to be a toll-free call at step 206, the method advances to step 210, where it is determined whether the inmate will hear advertising messages. By way of example, the inmate may be prompted to indicate whether he or she desires to hear advertisements. In other cases, it may be administratively decided that all or a selected set of inmates will be subjected to advertisements when placing a call to the call processing system 106. If it is determined at step 210 that the inmate will listen to advertisements, an advertisement is selected from a play list and is played for the inmate at step 212. In certain embodiments, the inmate may be provided with a choice of advertisement categories to choose from, such as advertisements from bail bondsmen, advertisements from criminal defense attorneys, advertisements from private investigators, etc.

After an advertising message is played, a determination is made at step 214 as to whether the inmate will leave a message for the advertiser. For example, the inmate may be prompted to press a certain button on the custodial facility phone 102 if he or she desires to leave a message for the advertiser. If it is determined at step 214 that the inmate will leave a message for the advertiser, the exemplary method proceeds to step 216 where the message is recorded and saved in the advertiser's voice mailbox. The advertiser's voice mailbox may be stored in a voice mail database 124b associated with the call processing system 106, or may be part of an independent voice mail system to which the inmate's message is forwarded.

After the inmate's message for the advertiser is recorded and saved at step 216 or if it was determined at step 214 that no such message would be recorded, the exemplary method advances to step 218 for a determination as to whether the inmate will hear another advertising message. Again, the inmate may be provide with the option to hear additional advertisements or may be forced to hear additional advertisements as a condition of using the call processing system 106. If it is determined at step 218 that the inmate will hear another advertising message, the exemplary method returns to and is repeated from step 212. When it is determined at step 218 that the inmate will not hear another advertising message, the exemplary method continues to step 220. At step 220, the inmate is informed that an outside party must have a pre-paid calling card or credit card (or other form of up-front payment) to accept a call from the inmate or to access the voice mailbox of the inmate.

Next at step 222, it is determined whether the inmate will hear information regarding the purchase of pre-paid calling cards. The inmate may be provided with the option to listen to an informational message regarding locations where pre-paid calling cards can be purchased, etc. or may be forced to hear such information as a condition of using the call processing system 106. If the inmate will hear information regarding the purchase of pre-paid calling cards, such an information message is played at step 224. After playing the information message at step 224 or after determining at step 222 that no such message should be played, the method continues to step 226.

Referring now to FIG. 2B, a determination is made at step 226 as to whether the inmate desires to use the call processing center 106 to access the voice mail system or to place an out-going call or whether the inmate desires to terminate or "quit" the present call. The inmate may be prompted to enter his or her selection. If the inmate chooses to quit, the exemplary method ends at step 248. If the inmate chooses to access the voice mail system, the method proceeds to step 246, where the inmate is connected to the system (e.g., the voice mail module 120), though which voice messages can be retrieved and recorded. Details regarding the inmate's use of the voice mail system are described further with reference to FIG. 3. After the inmate is finished interacting with the voice mail system, the exemplary method ends at step 248. In certain embodiments the inmate may be provided with the option to initiate an outgoing call to an outside party before being disconnected from the call processing center 106.

Returning to step 226, if it is determined that the inmate desires to place an outgoing call, the method advances to step 228, where the inmate is prompted to say his or her name and to input the number of the outside party to be called (the "called party"). Then at step 230, the inmate is placed on hold and the called party's phone number is dialed. Those skilled in the art will appreciate that many techniques may be used for connecting the inmate to the called party. As an example, call bridging, call forwarding and teleconferencing techniques could all be employed.

At step 232 a determination is made as to whether the called party answers the call. If the called party does not answer the call, the exemplary method moves to step 242, where the inmate is informed that the called party is not available or could not pay for the call. The inmate may also be provided with information regarding the sale of pre-paid calling cards. From step 242, the exemplary method proceeds to step 244 where it is determined whether the inmate desires to access the voice mail system. If so, the inmate is connected to the voicemail system at step 246, through which a voice message can be recorded for the called party and/or other outside parties and voice messages can be retrieved. When the inmate is finished interacting with the voice mail system, the exemplary method ends at step 248.

Returning to step 232, if the called party does answer the call, the exemplary method moves to step 234, where the called party is informed that the call is from the inmate and that a pre-paid calling card number or credit card number should be input to accept the call. Next at step 236 it is determined whether the called party provided a payment to accept the call. If payment is provided by the called party, the inmate is connected to the called party at step 238. Again, whatever technique is used to connect the called party to the inmate, billing should be managed such that the call processing system 106 incurs no further charges. After the inmate has completed the call with the called party, the exemplary method ends at step 248.

Returning to step 236, if it is determined that no payment is provided by the called party, the exemplary method continues to step 240, where the called party is provided with information regarding the sale of pre-paid calling cards and is then disconnected from the call. From step 240, the method next advances to step 242, where the inmate is informed that the called party is not available or could not pay for the call. At this point, the inmate may also be provided with information regarding the sale of pre-paid calling cards. From step 242, the exemplary method proceeds to step 244 where it is determined whether the inmate desires to access the voice mail system. If so, the inmate is connected to the voicemail system at step 246, through which a voice message can be recorded for the called party and/or other outside parties and voice messages can be retrieved. When the inmate is finished interacting with the voice mail system, the exemplary method ends at step 248.

Figure 3:
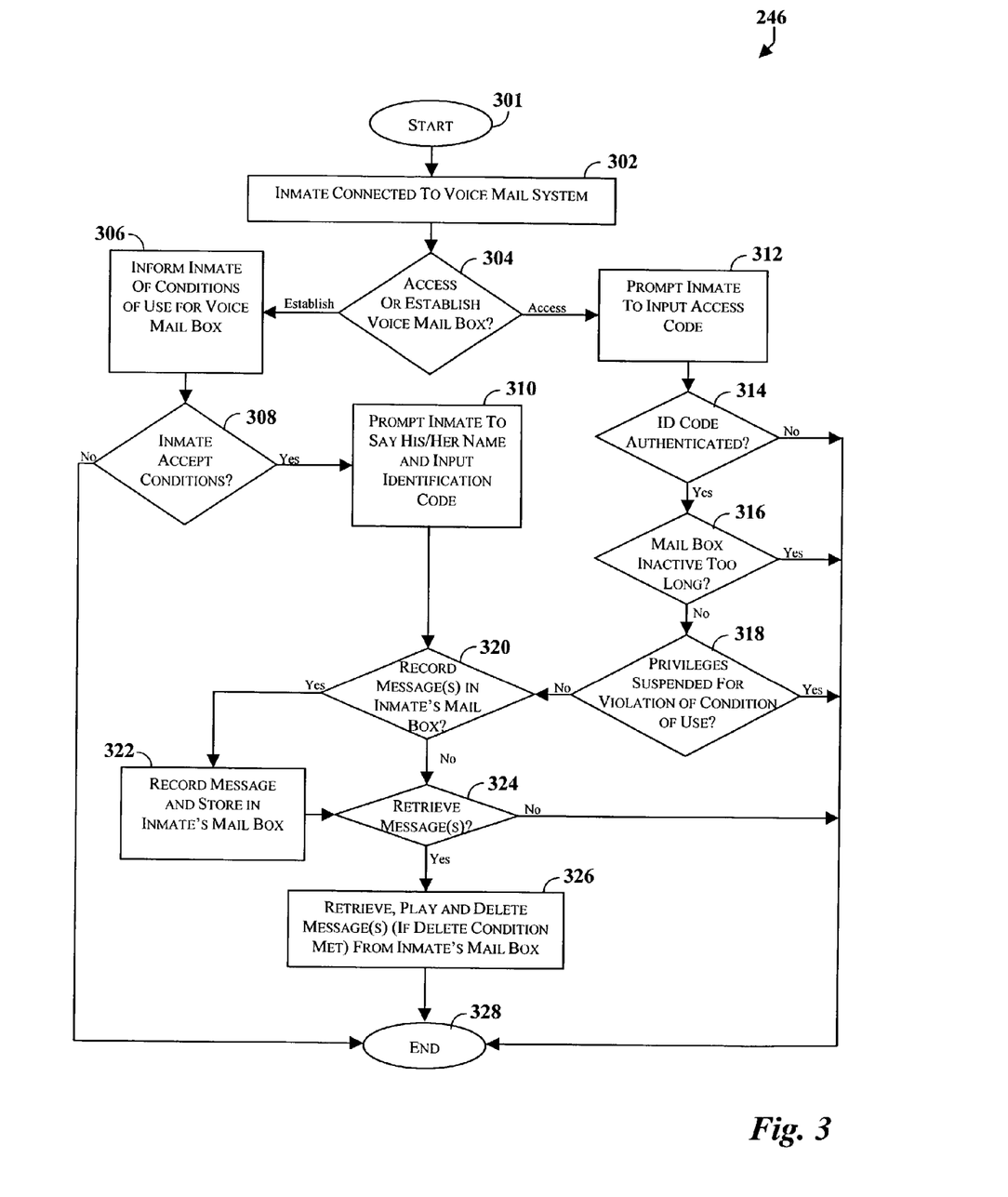
FIG. 3 is a flow chart illustrating an exemplary method for processing an inmate's request to interact with a voice mail system in accordance with certain embodiments of the present invention.

FIG. 3 is a flow chart illustrating an exemplary method for processing an inmate's request to interact with the voice mail system (see step 246 of FIG. 2B) in accordance with certain embodiments of the present invention. The exemplary method begins at start step 301 and proceeds to step 302, where the inmate is connected to the voice mail system. Again, the voice mail system may be implemented by the call processing system 106, for example by way of a voice mail module 120, or by a component within the telecommunication system 108. At step 304, a determination is made as to whether the inmate desires to access or establish his or her voice mailbox. If no voice mailbox has yet been established, the inmate will need to establish one before proceeding.

If the inmate chooses to establish a voice mailbox, the method moves to step 306, where the inmate is informed of all terms and conditions that apply to use of the voice mail system. By way of example, the inmate may be advised that voicemail is provided free to the inmate, but not to outside parties who access the inmate's voice mailbox. The inmate may also be informed that any message stored in the inmate's voice mailbox is not confidential. An exception to this rule may be made for any voice messages left by the inmate for an advertising attorney in the attorney's voice mailbox or for any attorney who otherwise pays a fee to maintain a voice mailbox on the system for the convenience of his or her inmate clients.

Another condition precedent may be that the inmate is permitted to listen to any message only a limited number of times (e.g., twice) before it is purged from the inmate's voice mailbox. Another condition may be that all messages, whether or not listened to the permitted number of times, will be purged every day at midnight (no subpoena work). As another example, once a message is recorded, it might only be erasable by the voice mail system during an automatic purge. The inmate may also be advised that use of the voice mail system will be suspended if he or she uses the voice mail system in a way that violates any law, court order or penal rule, or if the inmate attempts to setup a second voice mailbox, or permits another inmate to use their voice mailbox.

After any and all terms and conditions are audibly presented to the inmate at step 306, a determination is made at step 308 as to whether the inmate agrees to those terms and conditions. If not, the inmate's call is immediately terminated and the exemplary method ends at step 328. If the inmate accepts the terms and conditions, the method continues to step 310, where the inmate is prompted to say his or her name and to input an identification code. The identification code may be spoken by the inmate or typed using the keypad of the custodial facility phone 102. As one example, the identification code may be the inmate's date of birth, booking number, other identifying number assigned to the inmate by the custodial facility 100, or any combination thereof. The identification code becomes the inmate's access code, which in certain embodiments can be used by the inmate and by outside parties to access the inmate's voice mailbox. The voicemail system may be configured to verify that the name and identification code provided by the inmate are valid. Following step 310, the exemplary method advances to step 320, which is explained below.

Returning to step 304, if it is determined that the inmate desires to access his or her voice mailbox, the method advances to step 312, where the inmate is prompted to input his or her access code. Next, an attempt is made to authenticate the access code at step 314. If the access code cannot be authenticated, the inmate may be so advised before the call is terminated and the method ends at step 328. If the access code is authenticated, a check may be made at step 316 to determine whether the inmate's voice mailbox has remained inactive for more than a predetermined period of time (e.g., 30 days). Inactivity may be based at least in part upon use by the inmate and/or by the lack of activity by outside parties with regard to the inmate's voice mailbox. It also may be based at least in part upon outside parties not paying for enough forwarded calls to provide the service provider a desired level of profit. If the inmate's voice mailbox has remained inactive for too long, the inmate may be informed that the voice mailbox is no longer accessible and the inmate's call may be terminated. If the inmate's call is terminated, the method ends at step 328.

If the inmate's voice mailbox has not remained inactive for too long, the method moves from step 316 to step 318, where a check is made to determine whether the inmate's voice mail privileges have been suspended for violation of any term or condition of use of the voice mail system.

Information regarding violations of terms and conditions may be stored in a database associated with the voice mail system. Such information may be collected automatically, for example by the call processing system 106, and/or may be manually entered into the database by a system administrator. If the inmates privileges are suspended, the inmate may be so informed before the call is terminated and the method ends at step 328. If the inmate's privileges have not been suspended, the method proceeds to step 320.

At step 320, a determination is made as to whether the inmate desires to record a voice message in the inmate's voice mailbox. If so, the method proceeds to step 322, where the inmate's voice message is recorded and stored in the inmate's voice mailbox. Prior to allowing the inmate to record the voice message, it may be desirable to reminded the inmate that any messages left on the voicemail system are not confidential. As another option, one or more advertisements may be played to the inmate before the inmate's voice message is recorded and the inmate may be provided the opportunity to leave a message for the advertiser(s). Voice messages recorded by the inmate may or may not have a length or time restriction. for example, it may be decided that messages of any length can be recorded by an inmate because outside parties will later pay by the minute to listen to the messages.

After recording and storing a voice message at step 322 or if it was determined at step 320 that the inmate did not desire to record a message, the method moves to step 324 for a determination as to whether the inmate desires to retrieve any messages from the voice mailbox. If not, the inmate's call is terminated and the method ends at step 328. However, if the inmate desires to retrieve messages from his or her voice mailbox, the method moves to step 326, where messages in the inmate's voice mailbox are retrieved and played, voice messages may be retrieved and played, for example, in successive order from newest to oldest. The inmate may be provided with the opportunity to skip messages, replay messages, and to perform other typical voice mail functions. Preferably, however, the inmate will not be allowed to delete a message from his or her voice mailbox. Deleting of massages may be reserved from the system administrator or the voice mail system. Also at step 326, any message played to the inmate may be automatically deleted if any "delete conditions" are met. Delete conditions are any conditions that call for a message to be deleted. For example, a delete condition may be that any message played to the inmate twice is to be deleted. After the inmate finishes playing voice messages at step326, the exemplary method ends at step 328.

Figure 4:
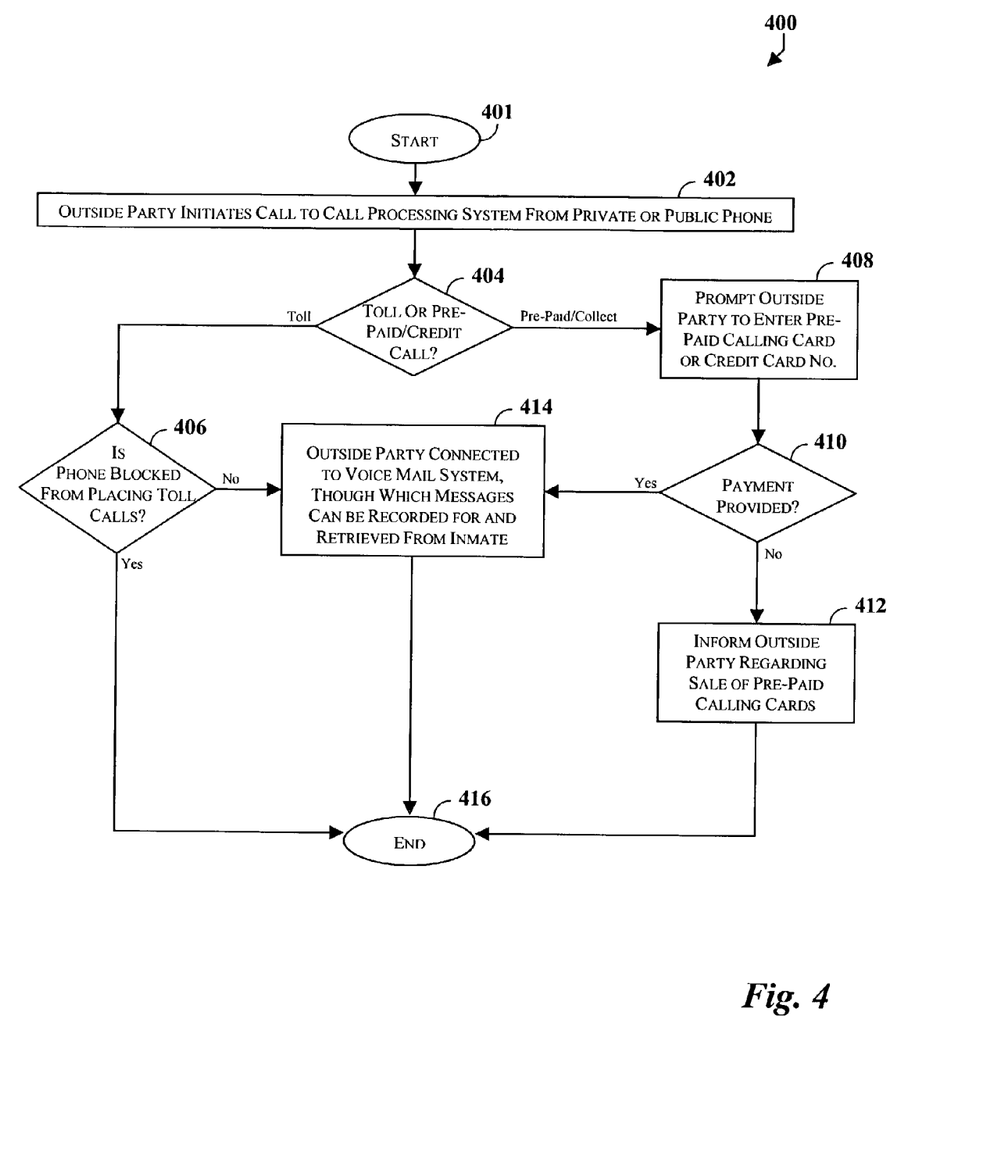
FIG. 4 is a flow chart illustrating an exemplary method for processing an outside party's request to interact with a voice mail system in accordance with certain embodiments of the present invention.

FIG. 4 is a flow chart illustrating an exemplary method for processing an outside party's request to interact with the voice mail system in accordance with certain embodiments of the present invention. The exemplary method begins at start step 401 and proceeds to step 402 where the outside party initiates a call to the voice mail system from an outside phone 104. The outside party may dial a toll number (e.g., a 900 number) or another phone number designated for use in connection with prepaid calling cards or credit cards. At step 404, a determination is made as to whether the call from the outside party is a toll call or a pre-paid calling card/credit card call. If the call is a toll call, the method moves to step 406 to determine whether the outside phone is blocked from placing toll calls. If the outside phone is blocked from placing toll calls, the outside party's call is terminated and the method ends at step 416.

If it is determined at step 404 that the outside party's call is a pre-paid calling card/credit card call, the method moves to step 408, where the outside party is prompted to enter the pre-paid calling card number or credit card number (or other form of payment). Next at step 410, it is determined whether the outside party provided payment for the call and whether the payment could be verified. If not, the outside party may be informed at step 412 regarding the sale of pre-paid calling cards. After step 412, the outside party's call is terminated and the method ends at step 416.

If it is determined at step 406 that the outside phone is not blocked from placing toll calls 410 or if it is determined at step 410 that the outside party provided payment for the call, the method proceeds to step 414, where the outside party is connected to the voice mail system. Once connected to the voice mail system, the outside party can record messages for and retrieve messages from the inmate. The voice mail system may function in any manner known in the art and may optionally be customized to address any legal and/or administrative issues regarding inmates and custodial facilities. By way of illustration only, the voice mail system may be configured to provide instructions in multiple languages, advise the outside party of the cost of using the system, advise the outside party that any messages recorded on the system are not confidential and that messages may be automatically purged. As mentioned previously, the voice mail system may be configured such that the outside party is required to provide an access code in order to gain access to the inmate's voice mailbox. The access code may be an inmate identification code, such as social security number, date of birth, booking number, etc. In certain embodiment, the outside caller may be allowed to record messages of any length because the outside party pays for the call. In certain embodiments, the outside party may only be provided access to voice messages recorded by the inmate, as opposed to other voice messages that may be stored in the inmate's voice mailbox.

As may be seen from the foregoing, the present invention provides systems and methods for providing pre-paid calling and voice messaging services for inmates and their families and friends. It should be appreciated that the exemplary aspects and features of the present invention as described above are not intended to be interpreted as required or essential elements of the invention, unless explicitly stated as such. It should also be appreciated that the foregoing description of exemplary embodiments was provided by way of illustration only and that many other modifications, features, embodiments and operating environments are possible. Accordingly, the scope of the present invention should be limited only by the claims to follow.

I claim:

1. A method for processing a call placed by an inmate from a custodial facility using a custodial facility phone, comprising:

receiving an incoming call from the custodial facility phone, the incoming call being free of charge to the inmate;

prompting the inmate to input a phone number for an outside party to be called;

placing an outgoing call to the outside party using the phone number input by the inmate;

if the outside party answers the outgoing call, determining whether the outside party provides a payment to cover charges for being connected to the inmate; and if the outside party provides the payment, connecting the inmate to the outgoing call and terminating the incoming call;

playing an advertising message to the inmate during the incoming call from the inmate, the advertising message paid for by an advertiser; and providing the inmate with an opportunity to leave a voice message for the advertiser in a voice mailbox assigned to the advertiser.

2. A computer-readable medium having stored thereon computer-executable instructions for performing the method of claim 1.

3. The method of claim 1, further comprising the steps of:

if the outside party does not answer the outgoing call, informing the inmate that the outside party is not available and providing the inmate an opportunity to record a voice message for the outside party in a voice mailbox assigned to the inmate.

4. A computer-readable medium having stored thereon computer-executable instructions for performing the method of claim 3.

5. The method of claim 1, further comprising the step of providing the outside party with access to the voice mailbox assigned to the inmate in exchange for an access fee.

6. A computer-readable medium having stored thereon computer-executable instructions for performing the method of claim 5.

7. The method of claim 5, wherein the access fee is paid by the outside party by way of one of the group consisting of: a toll charge billed to a phone bill of the outside party, a prepaid calling card, a credit card and a debit card.

8. The method of claim 1, wherein the incoming call is selected from the group consisting of: a collect call from the inmate, a toll-free call from the inmate and a tie-line call from the inmate.

9. The method of claim 1, wherein the advertising message relates to services selected from the group consisting of: bail bond services and attorney services.

10. The method of claim 1, further comprising the steps of:

allowing the advertiser to specify one or more geographic regions in which the advertising message is to be targeted; and wherein the advertising message is presented to the inmate only if the inmate has ties to the one or more geographic regions.

11. The method of claim 1, further comprising the steps of:

receiving advertising revenue from an advertiser in exchange for the service of presenting an advertising message to the outside party during the outgoing call to the outside party;

using the advertising revenue to cover charges for the incoming call from the inmate; and providing the outside party with an opportunity to record a voice message for the advertiser in response to the advertising message and storing the voice message in a voice mailbox assigned to the advertiser.

12. The method of claim 1, further comprising the steps of:

if the outside party does not provide the payment, informing the outside party regarding the sale of prepaid calling cards and terminating the outgoing call without connecting the inmate to the outgoing call; and after terminating the outgoing call, providing the inmate with an opportunity to record a voice message for the outside party in a voice mail box assigned to the inmate.

13. A computer-readable medium having stored thereon computer-executable instructions for performing the method of claim 12.

14. The method of claim 1, further comprising the steps of:

upon receiving the incoming call, identifying an origination number of the custodial facility phone from which the incoming call is placed;

determining whether the origination number is associated with an authorized custodial facility; and if the origination number is not associated with an authorized custodial facility, terminating the incoming call prior to prompting the inmate to input the phone number for the outside party to be called.

15. A computer-readable medium having stored thereon computer-executable instructions for performing the method of claim 14.

16. The method of claim 14, further comprising the steps of:

providing the inmate with the opportunity to access a voice mailbox assigned to the inmate in order to retrieve one or more voice messages;

if the inmate desires to access the voice mailbox, prompting the inmate to input an access code; and if the access code cannot be authenticated or if the voice mailbox has been inactive for too long or if the inmate's voice mail privileges have been suspended for violation of any condition placed upon use of the voice mailbox, denying the inmate access to the voice mailbox.

17. The method of claim 16, wherein the access code comprises an inmate identification code assigned to the inmate by the custodial facility.

18. The method of claim 3, further comprising the step of: if the outside party is an advertising attorney or any attorney maintaining a voice mailbox, treating the voice message as confidential between the inmate and the attorney.

19. A computer-readable medium having stored thereon computer-executable instructions for performing the method of claim 18.

20. A method for processing a call placed by an inmate from a custodial facility using a custodial facility phone, comprising:

receiving an incoming call from the custodial facility phone, the incoming call being free of charge to the inmate;

providing the inmate an opportunity to record a voice message for an outside party in a voice mailbox assigned to the inmate;

providing the outside party with access to the voice mailbox assigned to the inmate in exchange for an access fee;

receiving advertising revenue from an advertiser in exchange for the service of presenting an advertising message to the inmate during the incoming call;

using the advertising revenue to cover charges for the incoming call from the inmate;

playing an advertising message to the inmate during the incoming call from the inmate, the advertising message paid for by an advertiser; and providing the inmate with an opportunity to leave a voice message for the advertiser in a voice mailbox assigned to the advertiser.

21. The method of claim 20, wherein the advertising message relates to services selected from the group consisting of: bail bond services and attorney services.

22. The method of claim 20, further comprising the steps of:
allowing the advertiser to specify one or more geographic regions in which the advertising message is to be targeted; and
presenting the advertising message to the inmate only if the inmate has ties to the one or more geographic regions.

23. The method of claim 20, further comprising the steps of:
providing the inmate with the opportunity to access a voice mailbox assigned to the inmate in order to retrieve one or more voice messages;
if the inmate desires to access the voice mailbox, prompting the inmate to input an access code; and
if the access code cannot be authenticated or if the voice mailbox has been inactive for too long or if the inmate's voice mail privileges have been suspended for violation of any condition placed upon use of the voice mailbox, denying the inmate access to the voice mailbox.

24. A computer-readable medium having stored thereon computer-executable instructions for performing the method of claim 20.

25. The method of claim 20, further comprising the steps of:
upon receiving the incoming call, identifying an origination number of the custodial facility phone from which the incoming call is placed;
determining whether the origination number is associated with an authorized custodial facility; and
if the origination number is not associated with an authorized custodial facility, terminating the incoming call prior to providing the inmate the opportunity to record the voice message for the outside party in the voice mailbox assigned to the inmate.

26. A computer-readable medium having stored thereon computer-executable instructions for performing the method of claim 25.

27. The method of claim 23, wherein the access code comprises an inmate identification code assigned to the inmate by the custodial facility.

28. The method of claim 23, further comprising the step of if the access code can be authenticated and if the voice mailbox has not been inactive for too long and if the inmate's voice mail privileges have not been suspended, allowing the inmate to perform at least one of retrieving one or more voice messages from the voice mailbox and leaving one or more voice messages in the voice mailbox.

29. A computer-readable medium having stored thereon computer-executable instructions for performing the method of claim 28.

30. A system for processing a call placed by an inmate from a custodial facility using a custodial facility phone, comprising:
means for receiving an incoming call from the custodial facility phone, the incoming call being free of charge to the inmate;
means for prompting the inmate to choose between accessing a voice mail system and calling an outside party;
means for providing the inmate access to a voice mailbox assigned to the inmate if the inmate chooses to access the voice mail system;
means for prompting the inmate to input a phone number for the outside party if the inmate chooses to call the outside party;
means for placing an outgoing call to the outside party using the phone number input by the inmate;
means for determining whether the outside party provides a payment to cover charges for being connected to the inmate if the outside party answers the outgoing call;
means for connecting the inmate to the outgoing call and terminating the incoming call if the outside party provides the payment;
means for presenting an advertising message to the outside party during the outgoing call to the outside party, the advertising message being paid for through advertising revenue collected from the advertiser;
means for providing the outside party with an opportunity to leave a voice message for the advertiser in a voice mailbox assigned to the advertiser; and
wherein the advertising revenue is used to cover charges for the incoming call from the inmate.

31. The system of claim 30, further comprising:
means for providing the outside party with access to the voice mailbox assigned to the inmate in exchange for an access fee; and
wherein the access fee is paid by the outside party by way of one of the group consisting of: a toll charge billed to a phone bill of the outside party, a prepaid calling card, a credit card and a debit card.

32. The system of claim 30, wherein the incoming call is selected from the group consisting of: a collect call from the inmate, a toll-free call from the inmate and a tie-line call from the inmate.

33. The system of claim 30, further comprising:
means for presenting an advertising message to the inmate during the incoming call, the advertising message paid for through advertising revenue collected from an advertiser; and
wherein the advertising revenue is used to cover charges for the incoming call from the inmate.

34. The system of claim 33, wherein the advertising message relates to services selected from the group consisting of: bail bond services and attorney services.

35. The system of claim 33, further comprising means for providing the inmate with an opportunity to leave a voice message for the advertiser in a voice mailbox assigned to the advertiser.

36. The system of claim 30, further comprising:
means for allowing the advertiser to specify one or more geographic regions in which the advertising message is to be targeted; and
wherein the means for presenting the advertising message to the inmate during the incoming call are configured to present the advertising message to the inmate only if the inmate has ties to the one or more geographic regions.

37. The system of claim 30, wherein the advertising message relates to services selected from the group consisting of: bail bond services and attorney services.

38. The system of claim 30, further comprising:
means for allowing the advertiser to specify one or more geographic regions in which the advertising message is to be targeted; and
wherein the means for presenting the advertising message to the outside party during the outgoing call are configured to present the advertising message to the outside party only if the phone number of the outside party is associated with the one or more geographic regions.

39. The system of claim 30, wherein the payment is provided by the outside party by way of one of the group consisting of: a prepaid calling card, a credit card and a debit card.

40. The system of claim 30, further comprising:
means for informing the outside party regarding the sale of prepaid calling cards and terminating the outgoing call without connecting the inmate to the outgoing call, if the outside party does not provide the payment; and
means for providing the inmate with an opportunity to record a voice message for the outside party in the voice mail box assigned to the inmate after terminating the outgoing call.

41. The system of claim 30, further comprising:
means for identifying an origination number of the custodial facility phone from which the incoming call is placed;
means for determining whether the origination number is associated with an authorized custodial facility; and
means for terminating the incoming call prior to prompting the inmate to choose between accessing the voice mail system and calling the outside party if the origination number is not associated with an authorized custodial facility.

42. The system of claim 30, further comprising:
means for prompting the inmate to input an access code if the inmate desires to access the voice mailbox; and
means for denying the inmate access to the voice mailbox if the access code cannot be authenticated or if the voice mailbox has been inactive for too long or if the inmate's voice mail privileges have been suspended for violation of any condition placed upon use of the voice mailbox.

43. The system of claim 42, wherein the access code comprises an inmate identification code assigned to the inmate by the custodial facility.

44. The method of claim 42, further comprising means for allowing the inmate to retrieve one or more voice messages from the voice mailbox the access code can be authenticated and if the voice mailbox has not been inactive for too long and if the inmate's voice mail privileges have not been suspended.

45. The method of claim 30, further comprising means for treating the voice message as confidential between the inmate and the outside party if the outside party is an advertising attorney or any attorney maintaining a voice mailbox.

* * * * *